(12) United States Patent
Jeong

(10) Patent No.: US 10,747,490 B2
(45) Date of Patent: Aug. 18, 2020

(54) METHOD AND DEVICE FOR DISPLAYING AN IMAGE TRANSMITTED FROM A WEARABLE DEVICE

(71) Applicant: SAMSUNG ELECTRONICS CO., LTD., Suwon-si (KR)

(72) Inventor: Hak-su Jeong, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 133 days.

(21) Appl. No.: 15/127,844

(22) PCT Filed: Mar. 23, 2015

(86) PCT No.: PCT/KR2015/002809
§ 371 (c)(1),
(2) Date: Sep. 21, 2016

(87) PCT Pub. No.: WO2015/142135
PCT Pub. Date: Sep. 24, 2015

(65) Prior Publication Data
US 2017/0097802 A1    Apr. 6, 2017

(30) Foreign Application Priority Data

Mar. 21, 2014 (KR) .................. 10-2014-0033709
Feb. 13, 2015 (KR) .................. 10-2015-0022722

(51) Int. Cl.
*G06F 3/14* (2006.01)
*G09G 3/00* (2006.01)
(Continued)

(52) U.S. Cl.
CPC ............ *G06F 3/1454* (2013.01); *G06F 1/163* (2013.01); *G06F 1/1626* (2013.01); *G06F 3/011* (2013.01);
(Continued)

(58) Field of Classification Search
CPC .............................. G06F 3/1454; G06F 1/163
See application file for complete search history.

(56) References Cited

U.S. PATENT DOCUMENTS 6,898,620 B1 * 5/2005 Ludwig ................. H04M 3/567
                                                        348/14.09
7,938,727 B1    5/2011 Konkle
(Continued)

FOREIGN PATENT DOCUMENTS

EP    2 242 240 A1   10/2010
EP    2562638 A1     2/2013
(Continued)

OTHER PUBLICATIONS

WIPO Translation of WO 2013/180318.*
(Continued)

*Primary Examiner* — Alvin H Tan
(74) *Attorney, Agent, or Firm* — Sughrue Mion, PLLC

(57) ABSTRACT

Provided is a method for displaying an image on a device. The method includes: acquiring, by a wearable device, use information indicating whether a user uses the device; determining at least a portion of an image displayed by the wearable device according to the use information acquired; and transmitting the at least a portion of the image determined to the device.

9 Claims, 16 Drawing Sheets

(51) Int. Cl.
*G09G 5/14* (2006.01)
*G06F 1/16* (2006.01)
*G06F 3/03* (2006.01)
*G06F 3/01* (2006.01)
*G06F 3/0484* (2013.01)

(52) U.S. Cl.
CPC .......... *G06F 3/0304* (2013.01); *G06F 3/0484* (2013.01); *G06F 3/14* (2013.01); *G06F 3/1423* (2013.01); *G09G 3/002* (2013.01); *G09G 3/003* (2013.01); *G09G 5/14* (2013.01); *G09G 2340/12* (2013.01); *G09G 2340/125* (2013.01); *G09G 2340/14* (2013.01); *G09G 2370/042* (2013.01); *G09G 2370/06* (2013.01); *G09G 2370/16* (2013.01); *G09G 2380/02* (2013.01)

(56) References Cited

U.S. PATENT DOCUMENTS

| | | | |
|---|---|---|---|
| 8,350,814 B2 | 1/2013 | Kim et al. | |
| 8,565,829 B2 | 10/2013 | Kim et al. | |
| 8,621,352 B2* | 12/2013 | Ding | G06F 3/1454 715/719 |
| 8,863,169 B2* | 10/2014 | Hayashi | H04N 7/165 725/12 |
| 9,665,336 B2* | 5/2017 | Karunakaran | G06F 3/1454 |
| 9,729,697 B2* | 8/2017 | Song | G06F 3/014 |
| 2004/0268400 A1* | 12/2004 | Barde | H04N 21/8153 725/94 |
| 2008/0065238 A1 | 3/2008 | Igoe | |
| 2009/0235300 A1 | 9/2009 | Hayashi | |
| 2012/0105306 A1 | 5/2012 | Fleck | |
| 2012/0105428 A1 | 5/2012 | Fleck et al. | |
| 2012/0147268 A1 | 6/2012 | Hassan et al. | |
| 2014/0002389 A1 | 1/2014 | Kim et al. | |
| 2014/0009394 A1 | 1/2014 | Lee et al. | |
| 2014/0089847 A1 | 3/2014 | Seo et al. | |
| 2014/0089967 A1 | 3/2014 | Mandalia et al. | |
| 2015/0009096 A1* | 1/2015 | Lee | G06F 1/163 345/2.2 |
| 2015/0022438 A1* | 1/2015 | Hong | H04M 1/7253 345/156 |
| 2015/0220110 A1* | 8/2015 | Brawer | G04G 11/00 361/679.03 |

FOREIGN PATENT DOCUMENTS

| | | |
|---|---|---|
| KR | 10-2007-0018818 A | 2/2007 |
| KR | 10-2013-0134392 A | 12/2013 |
| KR | 10-2014-0006523 A | 1/2014 |
| KR | 10-2014-0009851 A | 1/2014 |
| KR | 20-2014-0000570 U | 1/2014 |
| WO | 01/47248 A2 | 6/2001 |
| WO | 2011/022014 A1 | 2/2011 |

OTHER PUBLICATIONS

International Search Report for PCT/KR2015/002809 dated Jun. 11, 2015 [PCT/ISA/210].
Written Opinion for PCT/KR2015/002809 dated Jun. 11, 2015 [PCT/ISA/237].
Communication dated Aug. 1, 2017, from the European Patent Office in counterpart European Application No. 15765827.9.
Communication dated Feb. 28, 2018, issued by the European Patent Office in counterpart European application No. 15765827.9.
Reexamination Report dated Nov. 13, 2018, issued by the European Patent Office in counterpart European Application No. 15765827.9.
Communication dated Aug. 6, 2019 by the European Patent Office in counterpart European Patent Application No. 15765827.9.

* cited by examiner

FIG. 10
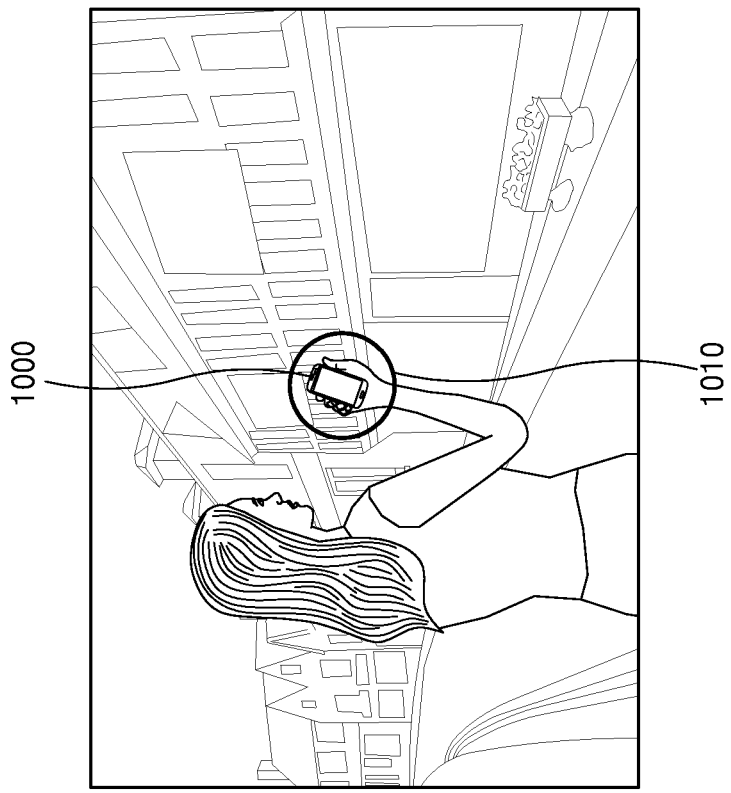
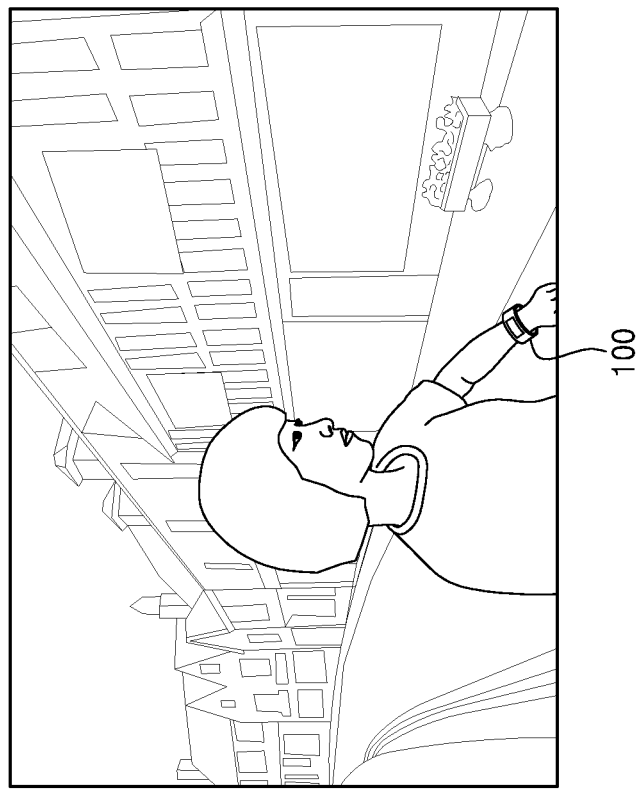

METHOD AND DEVICE FOR DISPLAYING AN IMAGE TRANSMITTED FROM A WEARABLE DEVICE

TECHNICAL FIELD

The inventive concept relates to a method for displaying an image, a device for displaying an image, and a recording medium storing a method for displaying an image.

BACKGROUND ART

Recently, with the development of information communication technology and network technology, devices have evolved into portable multimedia devices having various functions. In recent years, extensive research is conducted to provide available services in devices optimally according to user operations by detecting the user operations.

The methods for users to receive services from devices have diversified with an increase in the number and types of devices used by each user. Unlike in the case where a user uses one device, in the case where a user uses a plurality of devices, there is a need to provide a user interface in further consideration of the respective characteristics of the plurality of devices and the methods for the user to use the plurality of devices.

DETAILED DESCRIPTION OF THE INVENTION

Technical Problem

Embodiments of the inventive concept provide a method and device for displaying an image, which determines whether a user uses a device and then transmits an image displayed by a wearable device to the device, thereby allowing the user to seamlessly view the image.

Technical Solution

According to an embodiment of the inventive concept, a method for displaying an image includes: acquiring, by a wearable device, use information indicating whether a user uses a device; determining at least a portion of an image displayed by the wearable device according to the use information acquired; and transmitting the at least a portion of the image determined to the device.

Advantageous Effects of the Invention

According to the embodiments of the inventive concept, by determining whether the user uses the device and then transmitting the image displayed by the wearable device to the device, the user may seamlessly view the image.

DESCRIPTION OF THE DRAWINGS

FIG. 10 is a diagram illustrating a method of generating use information according to the distance between a wearable device of a user and a device of another user, according to an embodiment of the inventive concept.

BEST MODE

Figure 1:
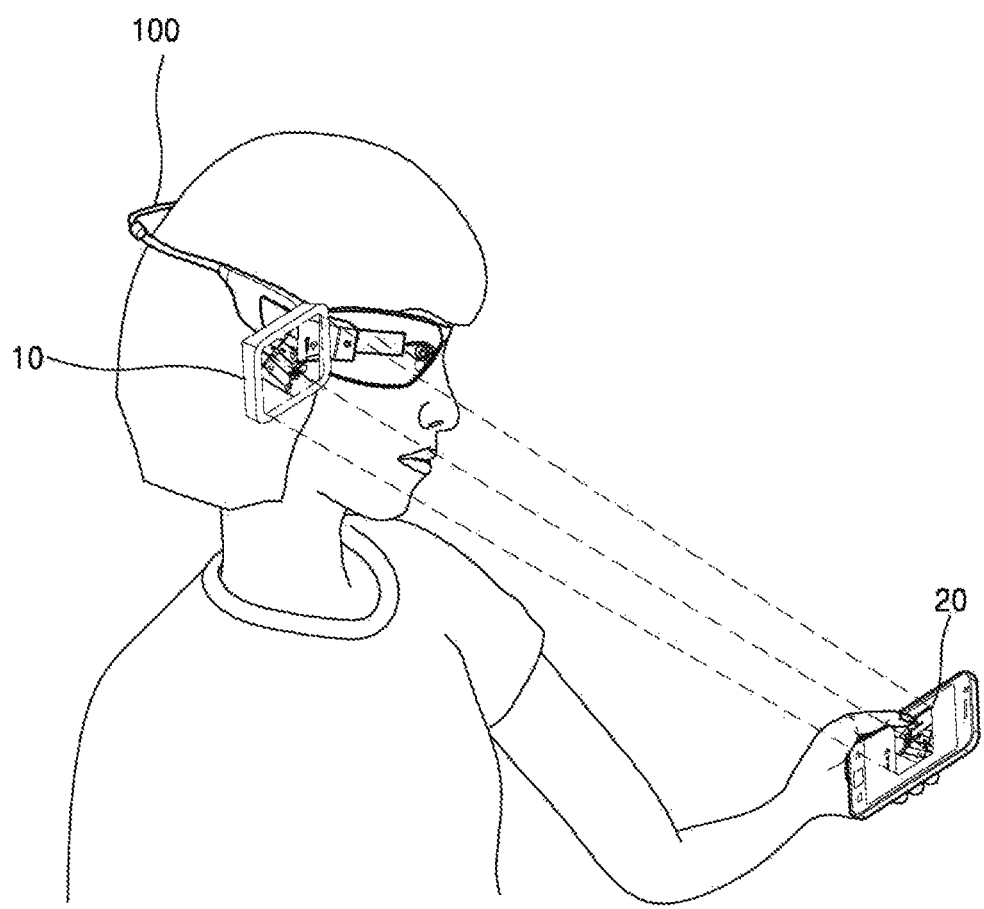
FIG. 1 is a conceptual diagram illustrating an image display system according to an embodiment of the inventive concept.

According to an embodiment of the inventive concept, a method for displaying an image includes: acquiring, by a wearable device, use information indicating whether a user uses a device; determining at least a portion of an image displayed by the wearable device according to the use information acquired; and transmitting the at least a portion of the image determined to the device.

According to another embodiment of the inventive concept, a method for displaying an image includes: transmitting use information indicating whether a user uses a device to a wearable device; receiving at least a portion of an image determined by the wearable device according to the use information acquired from the wearable device; and displaying the at least a portion of the image determined.

According to an embodiment of the inventive concept, a wearable device for displaying an image includes: an output unit configured to display an image; a communication unit configured to acquire use information indicating whether a user uses a device; and a control unit configured to determine at least a portion of the image displayed according to the use information acquired, wherein the communication unit transmits the at least a portion of the image determined to the device.

According to an embodiment of the inventive concept, a device for displaying an image includes: a sensing unit configured to detect whether a user uses the device; a control unit configured to generate use information indicating whether the user uses the device; a communication unit configured to transmit the use information generated to a wearable device and receive at least a portion of an image determined by the wearable device according to the use information acquired from the wearable device; and an output unit configured to display the at least a portion of the image received.

MODE OF THE INVENTION

Hereinafter, embodiments of the inventive concept will be described in detail with reference to the accompanying drawings so that those of ordinary skill in the art may easily implement the embodiments. In this regard, the inventive concept may have different forms and should not be construed as being limited to the descriptions set forth herein. In addition, portions irrelevant to the description of the inventive concept will be omitted in the drawings for a clear description of the inventive concept, and like reference numerals will denote like elements throughout the specification.

Throughout the specification, when an element is referred to as being "connected" to another element, it may be "directly connected" to the other element or may be "electrically connected" to the other element with one or more intervening elements therebetween. Also, when something is referred to as "including" a component, another component may be further included unless specified otherwise.

Throughout the specification, the term "application" may refer to a set of computer programs for performing particular operations. Applications described herein may vary according to various embodiments. For example, the applications may include, but are not limited to, video player applications, picture folder applications, messenger applications, navigation applications, memo applications, and exercise support applications.

In the specification, the term "use information" may refer to a signal indicating whether a user uses a device. When it is determined that the user uses the device, the use information may be generated by the device. When the device receives at least one of a plurality of preset user inputs from the user, the use information may be generated within a preset time from the time when the user input is received. Herein, the plurality of user inputs may be preset based on the operations that may occur when the user uses the device. For example, the use information may be generated when the device receives a user input including an operation of holding a portion of the device from the user. As another example, the use information may be generated when the device receives a user input including an operation of touching a screen of the device from the user. Also, the use information may include information about how the user uses the device.

Hereinafter, the inventive concept will be described in detail with reference to the accompanying drawings.

FIG. 1 is a conceptual diagram illustrating an image display system according to an embodiment of the inventive concept.

Referring to FIG. 1, the image display system may include a wearable device 100 and a device 200.

Only components related to the present embodiment are illustrated in the image display system illustrated in FIG. 1. Thus, those of ordinary skill in the art will understand that other general-purpose components may be further included in addition to the components illustrated in FIG. 1.

The wearable device 100 may represent, for example, a device such as a smart glass or a smart watch that may be used while being worn on a portion of the user's body.

The wearable device 100 may display an image 10 on a screen according to the execution of an application. Herein, the image 10 may include at least one of a still image and a moving image. For example, the still image may include at least one picture that is displayed according to the execution of a picture folder application in the wearable device 100. Also, the still image may include at least one message that is displayed according to the execution of a messenger application in the wearable device 100. The moving image may include, for example, a movie or a drama that is displayed according to the execution of a video player application in the wearable device 100. Also, the moving image may include a real-time map that is displayed according to the execution of a navigation application in the wearable device 100.

According to an embodiment, the wearable device 100 may communicate information with the device 200. For example, the wearable device 100 may acquire, from the device 200, use information indicating whether the user uses the device 200. Herein, when it is determined that the user uses the device 200, the use information may be generated by the device 200.

When the device 200 receives at least one of a plurality of preset user inputs from the user, the use information may be generated by the device 200 within a preset time from the time when the user input is received. For example, the use information may be generated by the device 200 within 0.05 seconds from the time when the device 200 receives a user input including an operation of holding a portion of the device 200.

Also, a plurality of user inputs may be set differently according to users according to the operation characteristics of the users using the device 200. For example, when the user uses the device 200 while holding a top left portion of the device 200, the device 200 may generate the use information when receiving a user input including an operation of holding the top left portion.

According to another embodiment, the use information may be generated when the device 200 receives a plurality of preset user inputs from the user. For example, the use information may be generated when the device 200 receives a user input including a user's operation of touching the screen of the device 200 and a user input including a user's operation of looking at the screen of the device 200 for 2 seconds or more.

Also, according to another embodiment, the use information may be generated when the distance between the wearable device 100 and the device 200 is within a predetermined range. A method of determining the distance between the wearable device 100 and the device 200 will be described below in detail with reference to FIGS. 8 and 9.

According to acquiring the use information, the wearable device 100 may transmit information about the image displayed by the wearable device 100 to the device 200. Herein, the information about the image may be determined according to the type of the image 10 displayed.

For example, when a still image is displayed by the wearable device 100, the information about the image may include an image obtained by capturing the screen where the still image is displayed. Also, when a moving image is displayed by the wearable device 100, the information about the image may include synchronization information representing the current play position of the moving image and the identification value of the moving image displayed. As another example, when a moving image is displayed by the wearable device 100, the information about the image may include both the synchronization information and the image obtained by capturing the screen where the moving image is displayed.

According to transmitting the use information to the wearable device 100, the device 100 may receive information about the image 10 displayed by the wearable device 100 from the wearable device 100. For example, the device 200 may receive an image obtained by capturing the screen of the wearable device 100. Also, as another example, the device 200 may receive synchronization information about the moving image displayed by the wearable device 100. Also, as another example, the device 200 may receive both the synchronization information about the moving image and the image obtained by capturing the screen of the wearable device 100 where the moving image is displayed.

By using the information about the image received from the wearable device 100, the device 200 may display at least a partial image (hereinafter referred to as second image) 20 of the image (hereinafter referred to as first image) 10 displayed by the wearable device 100. The second image 20 may be displayed by the device 200 according to the same display standard as the first image 10. For example, the image quality of the image displayed, the aspect ratio of the image, and the size of the image may be determined according to the display standard. As another example, according to the user's setting, the second image 20 may be displayed according to the different display standard from the first image 10. For example, the device 200 may display the second image 20 in the different size from the first image 10.

Also, according to the user's setting, the device 200 may determine the display position of the second image 20 in the device 200. The second image 20 may be displayed at the top left of the screen while overlapping with the image displayed when the device 200 receives the information about the image. As another example, the device 200 may split the screen, display the second image 20 in a first region of the screen, and display the image, which is displayed when the information about the image is received, in a second region of the screen.

Figure 2:
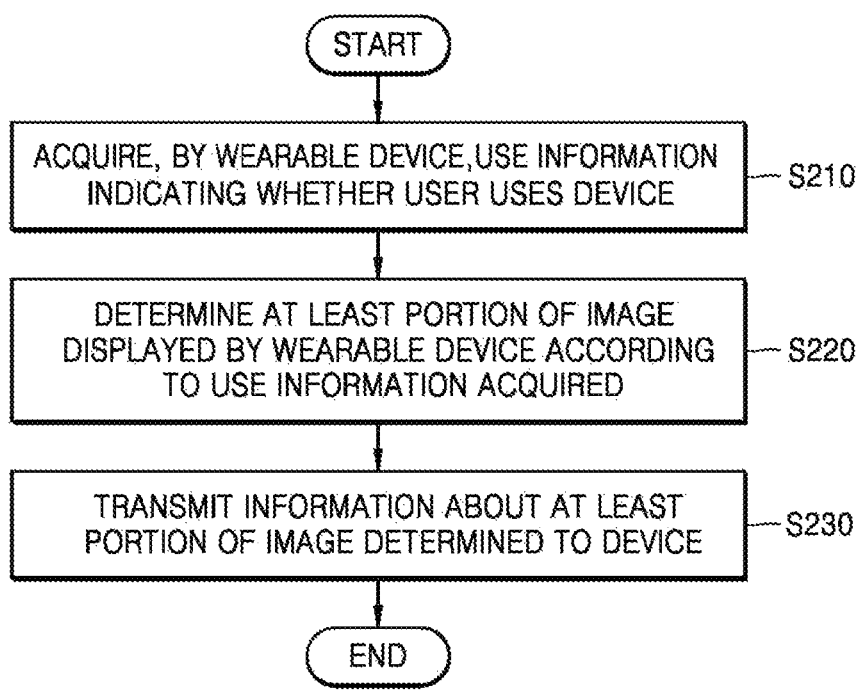
FIG. 2 is a flow diagram illustrating a method of transmitting at least a portion of an image to a device according as a wearable device acquires use information, according to an embodiment of the inventive concept.

FIG. 2 is a flow diagram illustrating a method of transmitting at least a portion of the image 10 to the device 200 according as the wearable device 100 acquires the use information, according to an embodiment of the inventive concept.

In operation S210, the wearable device 100 may acquire the use information indicating whether the user uses the device 200. When acquiring the use information, the wearable device 100 may determine that the user uses the device 200.

When the device 200 receives at least one of a plurality of preset user inputs from the user, the use information may be generated by the device 200. For example, the use information may be generated when the device 200 receives a user input including an operation of touching the screen from the user. As another example, the use information may be generated when the device receives a user input including an operation of detaching a touch pen provided in the device 200 from the device 200.

Also, in order to more accurately measure whether the user uses the device 200, the use information may be generated only when the identification information of the user prestored is identical to the identification information included in the user input received. For example, when the device 200 receives a user input including a touch operation, the use information may be generated only when the fingerprint information extracted in the touch operation and the fingerprint information of the user prestored match each other at a threshold ratio or more.

As another example, the use information may be generated when the device 200 receives a preset user input and the distance between the wearable device 100 and the device 200 is within a predetermined range. A method of determining the distance between the wearable device 100 and the device 200 will be described below in detail with reference to FIGS. 8 and 9.

In operation S220, the wearable device 100 may determine at least a portion of the image displayed by the wearable device 100 according to the use information acquired.

When acquiring the use information, the wearable device 100 may determine the type of the image displayed. A method of providing at least a portion of the image to the device 200 by the wearable device 100 may be determined according to the type of the image determined. When the image displayed is a still image, the wearable device 100 may capture an image displayed on the screen.

The still image displayed by the wearable device 100 may change at certain time intervals. When the still image displayed changes at certain time intervals, the wearable device 100 may capture and transmit an image of the still image changed. As another example, the wearable device 100 may capture the still images changed until receiving use end information indicating that the user ends the use of the device 200 from the device 200. Herein, the use end information may be generated when the user input used as a basis to generate the use information is not received by the device 200. For example, the use end information may be generated when the user puts down the held device 200 on the table.

Also, when the image displayed by the wearable device 100 is a moving image, the wearable device 100 may capture an image of the frame displayed at the time of receiving the use information.

According to another embodiment, the wearable device 100 may generate the synchronization information representing the play position of the moving image displayed at the time of receiving the use information. The wearable device 100 may determine the identification value of the moving image displayed at the time of receiving the use information. For example, when the moving image displayed is a movie B, a code number representing the movie B may be determined as the identification value of the moving image.

Also, in the entire play section of the moving image, the wearable device 100 may determine the current play position of the moving image displayed at the time of receiving the use information. For example, among a plurality of frames constituting the moving image, the wearable device 100 may determine the number of the frame displayed at the time of receiving the use information. The wearable device 100 may generate the synchronization information based on the current play position of the moving image and the identification value of the moving image.

According to an embodiment, when a moving image is displayed, the wearable device 100 may determine at least a portion of the image displayed on the entire screen. For example, the wearable device 100 may determine the entire image of the real-time map displayed according to the execution of the navigation application. As another example, when the wearable device 100 is a smart glass, the wearable device 100 may determine a picture in the user's viewing direction, which is a partial image, in the picture list that is the image displayed on the entire screen according to the execution of the picture folder application.

In operation S230, the wearable device 100 may transmit information about at least a portion of the image determined to the device 200.

According to an embodiment, when the image displayed is a still image, the wearable device 100 may transmit the image captured to the device 200. Also, when the image displayed is a moving image, the wearable device 100 may transmit the synchronization information to the device 200 together with the image captured.

Operation S230 is merely an embodiment of the inventive concept. For example, according to another embodiment, when the image displayed is a moving image, the wearable device 100 may transmit only the synchronization information to the device 200.

Figure 3:
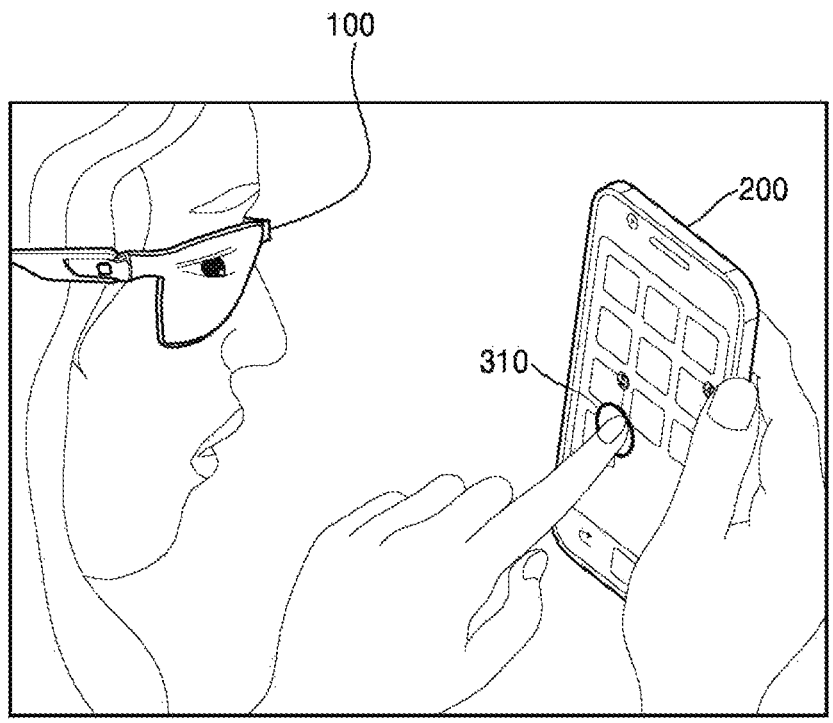
FIG. 3 is a diagram illustrating a method of a wearable device receiving use information according as a device acquires a user input, according to an embodiment of the inventive concept.

FIG. 3 is a diagram illustrating a method of the wearable device 100 receiving the use information according as the device 200 acquires the user input, according to an embodiment of the inventive concept.

Referring to FIG. 3, at least one picture may be displayed according to the execution of the picture folder application in the wearable device 100. The device 200 may receive a user input 310 including a touch input operation of the user. According to receiving the user input 310, the device 200 may generate the use information indicating that the user uses the device 200.

According to another embodiment, the device 200 may extract the fingerprint information included in the user input 310. The device 200 may determine whether the fingerprint information extracted and the fingerprint information of the user prestored match each other. The device 200 may generate the use information only when the fingerprint information extracted and the fingerprint information of the user prestored match each other at a threshold ratio or more.

The device 200 may transmit the use information generated to the wearable device 100.

When acquiring the use information from the device 200, the wearable device 100 may determine the type of the image displayed. For example, the wearable device 100 may determine at least one displayed picture as a still image.

The wearable device 100 may capture an image of the entire screen where the at least one displayed picture is displayed. According to another embodiment, the wearable device 100 may capture an image of the picture selected among the at least one displayed picture. For example, by detecting the user's view direction, when the user's view is focused on any one picture, the wearable device 100 may capture an image of the view-focused picture.

The wearable device 100 may transmit the captured image to the device 200. The device 200 may display the received captured image on one side of the screen of the device 200. However, this is merely an embodiment, and the device 200 may display the received captured image on the entire screen of the device 200.

Figure 4:
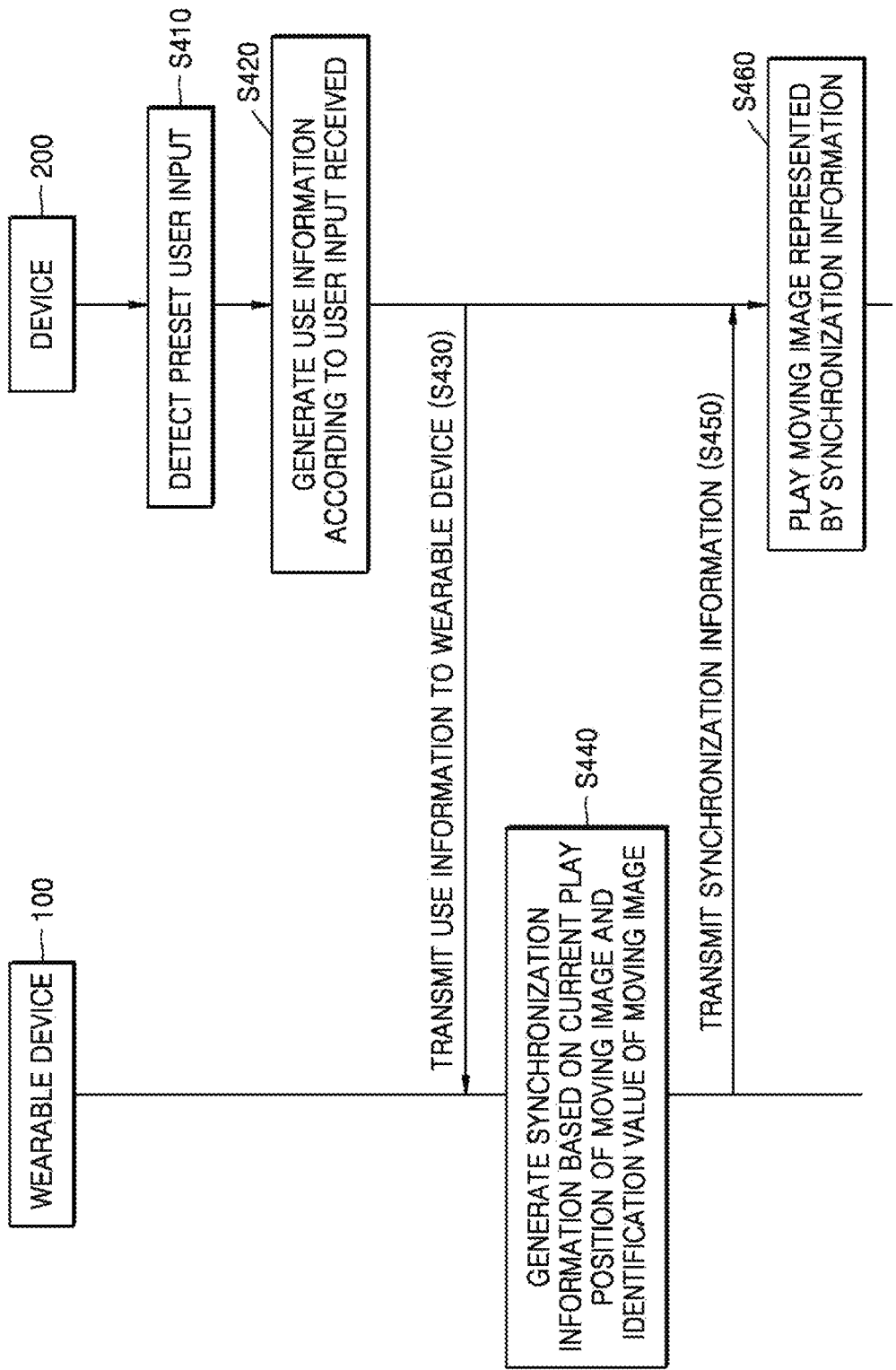
FIG. 4 is a flow diagram illustrating a method of transmitting synchronization information generated to a device when an image displayed by a wearable device is a moving image, according to an embodiment of the inventive concept.

FIG. 4 is a flow diagram illustrating a method of transmitting the synchronization information generated to the device 200 when the image displayed by the wearable device 100 is a moving image, according to an embodiment of the inventive concept.

In operation S410, the device 200 may receive at least one of a plurality of preset user inputs.

The plurality of user inputs may be preset based on the operations that may occur when the user uses the device. For example, the plurality of user inputs may include a user input including a user's operation of touching the screen, a user input including a user's operation of holding a portion of the device 200, a user input including a user's operation of detaching the touch pen provided in the device 200 from the device 200, and a user input including a user's operation of looking at the screen of the device 200 for a predetermined time or more. However, this is merely an embodiment, and the plurality of user inputs are not limited thereto.

Also, the plurality of user inputs may be set differently according to users according to the operation characteristics of the users using the device 200. For example, when the user is left-handed, the left-handed user may hold the left side of the device 200 unlike the right-hander holding the right side of the device 200. According to the operation characteristics of the user, in the case of the left-handed user, the device 200 may set an operation of holding the left side of device 200 as a user input.

In operation S420, the device 200 may generate the use information according to the user input received.

The use information may be generated when the device 200 receives any one of the plurality of preset user inputs. For example, the use information may be generated when the device 200 receives a user input including an operation of touching the screen from the user. As another example, the use information may be generated in the case of receiving both a user input including an operation of touching the screen and a user input including an operation of holding the screen.

The device 200 may generate the use information only when the identification information extracted from the user input received and the identification information of the user match each other. The device 200 may detect, from the user input, the identification information indicating that the received user input is acquired from the user of the device 200. For example, when receiving a user input including an operation of touching the screen, the device 200 may extract the fingerprint of the user from the user input.

According to another embodiment, the device 200 may generate the use information only when the distance between the wearable device 100 and the device 200 is within a predetermined range.

In operation S430, the device 200 may transmit the use information to the wearable device 100. According to an embodiment, the device 200 may periodically transmit the use information to the wearable device 100 while receiving the user input. For example, the device 200 may repeatedly transmit the use information to the wearable device 100 at 2-second intervals while the user holds the device 200.

In operation S440, according to acquiring the use information, the wearable device 100 may generate the synchronization information based on the current play position of the moving image and the identification value of the moving image displayed. In addition to the identification value of the moving image, the synchronization information may also include the identification value of an application capable of playing the moving image.

Also, the current play position of the moving image may include the number of a frame displayed at the time of receiving the use information, among a plurality of frames constituting the moving image.

As another example, the current play position of the moving image may include play data necessary to output a screen of the moving image displayed by the wearable device 100. The play data may vary according to the applications. For example, when the navigation application is executed in the wearable device 100, the play data may include the coordinate information of the location displayed on the real-time map at the time of acquiring the use information. As another example, when the exercise support application is executed in the wearable device 100, the play data may include the information about the position and the running speed of the user displayed at the time of acquiring the use information.

The synchronization information may further include the information about the storage position of the moving image. For example, the synchronization information may include the information about the link address of the external server storing the moving image and the identification information of the external device storing the moving image.

In operation S450, the wearable device 100 may transmit the synchronization information to the device 200. The wearable device 100 may transmit the identification information of the wearable device 100 to the device 200 together with the synchronization information. When receiving the synchronization information from a plurality of wearable devices, the device 200 may identify the synchronization information received from the plurality of wearable devices, through the identification information received together with the synchronization information.

According to another embodiment, together with the synchronization information, the wearable device 100 may transmit the captured image of the screen currently-displayed to the device 200. By receiving the captured image of the screen together with the synchronization information, the device 200 may display the captured image of the screen while determining the image displayed on the screen, thus allowing the user to seamlessly view the image.

In operation S460, the device 200 may play the moving image according to the received synchronization information.

According to an embodiment, from the received synchronization information, the device 200 may acquire the information about the identification value of the moving image and the play position of the moving image displayed by the wearable device 100. The device 200 may select the moving image matching the identification value of the moving image received among the identification values of the moving images stored. The device 200 may display the frame of the position corresponding to the information about the play position received in the selected moving image.

For example, when receiving an identification value "movie_B" of the moving image representing a movie B, the device 200 may select the movie B by comparing the received identification value with the identification value of the moving images stored. Also, the device 200 may display the 90th frame of the movie B on the screen by using the play position information indicating that the 90th frame of the movie B is played by the wearable device 100.

By using the synchronization information and the identification value of the moving image received, the device 200 may receive the moving image from the external device storing the moving image.

As another example, from the information about the play position of the moving image, the device 200 may acquire the play data necessary to output the screen displayed by the wearable device 100. For example, the device 200 may acquire the play data representing a location A and a scale 1:n, as the play data necessary to output the real-time map. By using the information about the play position of the moving image acquired, the device 200 may display the 1:n scale real-time map about the location A on the screen.

According to another embodiment, the device 200 may display the captured image of the screen of the wearable device 100 received together with the synchronization information. For example, according to the received synchronization information, while retrieving the 90th frame of the movie B, the device 200 may display the image of the 90th frame captured. When the 90th frame of the movie B is retrieved, the device 200 may play the moving image following the displayed image.

Figure 5:
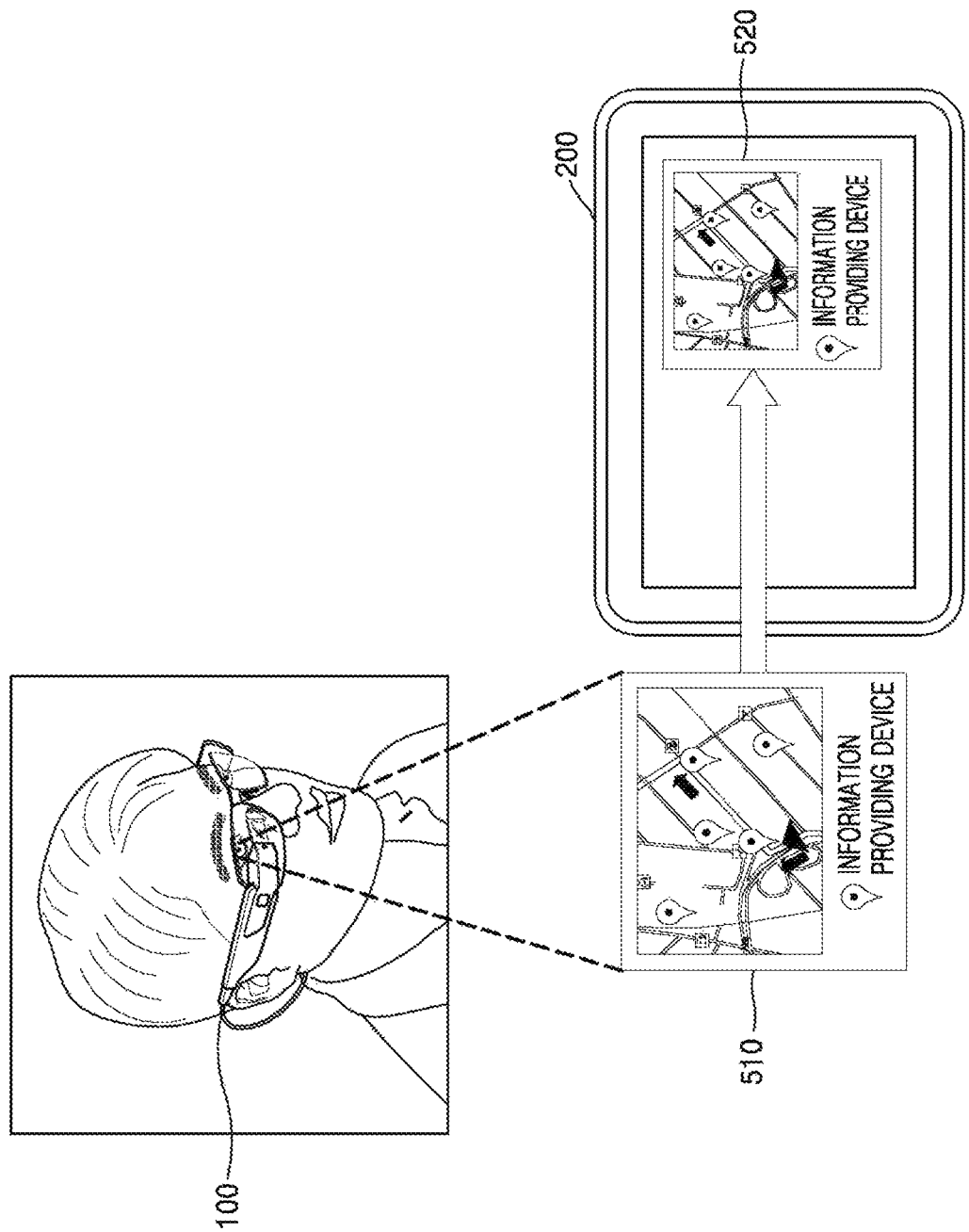
FIG. 5 is a diagram illustrating a method of transmitting synchronization information generated to a device when an image displayed by a wearable device is a moving image, according to an embodiment of the inventive concept.

FIG. 5 is a diagram illustrating a method of transmitting the synchronization information generated to the device 200 when the image displayed by the wearable device 100 is a moving image, according to an embodiment of the inventive concept.

The device 200 may receive a user input including an operation of looking at the screen of the device 200 for a predetermined time or more. According to receiving the user input, the device 200 may generate the use information indicating that the user uses the device 200.

The device 200 may transmit the use information to the wearable device 100. According to an embodiment, the device 200 may transmit the use information to the wearable device 100 at predetermined time intervals while receiving a user input of looking at the screen of the device 200 for a predetermined time or more. According to another embodiment, when receiving a user input of looking at the screen of the device 200 for a predetermined time, the device 200 may transmit the use information, and when no more receiving the user input of looking at the screen, the device 200 may transmit the use end information.

According to acquiring the use information, the wearable device 100 may generate the synchronization information based on the current play position of a moving image 510 and the identification value of the moving image 510 displayed.

Referring to FIG. 5, when the navigation application is executed in the wearable device 100, the current play position may include the information about the map scale and the coordinate information of the location displayed on the real-time map 510 displayed at the time of acquiring the use information. For example, the device 200 may acquire the information representing a location A and a scale 1:n, as the current play position necessary to output the real-time map 510.

According to another embodiment, the device 200 may display a captured image 520 of the screen of the wearable device 100 received together with the synchronization information. For example, according to the received synchronization information, while synchronizing the map displayed in the navigation application, the device 200 may display the captured image 520.

Figure 6:
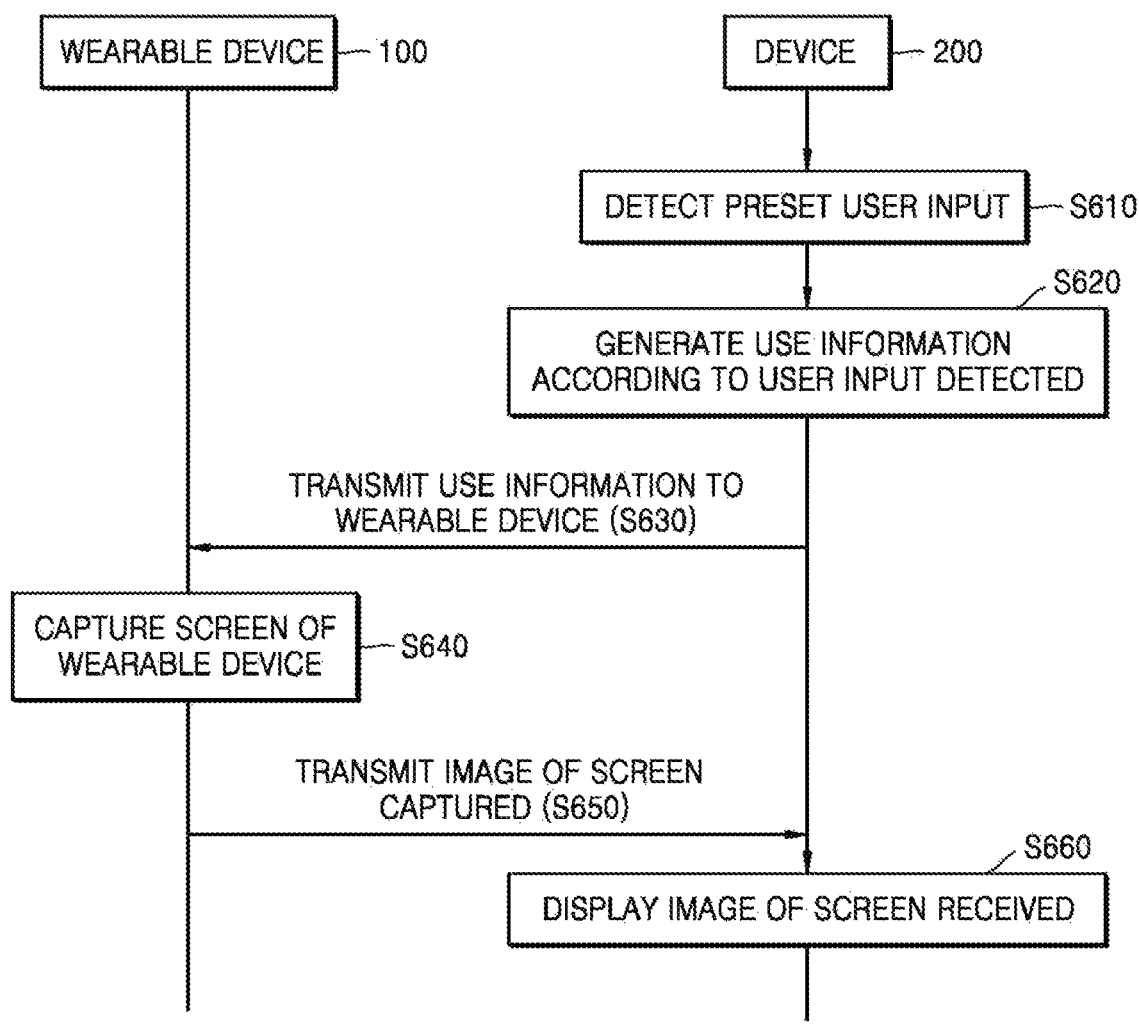
FIG. 6 is a flow diagram illustrating a method of transmitting an image of a screen captured to a device when an image displayed by a wearable device is a still image, according to an embodiment of the inventive concept.

FIG. 6 is a flow diagram illustrating a method of transmitting the image of the screen captured to the device 200 when the image displayed by the wearable device 100 is a still image, according to an embodiment of the inventive concept.

In operation S610, the device 200 may receive at least one of a plurality of preset user inputs. The plurality of user inputs may be preset based on the operations that may occur when the user uses the device.

Operation S610 may correspond to operation S410 described above with reference to FIG. 4.

In operation S620, the device 200 may generate the use information according to the user input received. The use information may be generated when the device 200 receives at least one of the plurality of preset user inputs.

Operation S620 may correspond to operation S420 described above with reference to FIG. 4.

In operation S630, the device 200 may transmit the use information to the wearable device 100. According to an embodiment, the device 200 may periodically transmit the use information to the wearable device 100 while receiving the user input.

According to another embodiment, after transmitting the use information generated according to the received user input, the device 200 may transmit the use end information at the time when the user input is not received.

Operation S630 may correspond to operation S430 described above with reference to FIG. 4.

In operation S640, the wearable device 100 may capture an image of the screen where a still image is displayed.

For example, the wearable device 100 may capture an image of the entire screen displaying at least one picture displayed according to the execution of the picture folder application. As another example, the wearable device 100 may capture an image of the picture selected among the at least one picture displayed. For example, by detecting the user's view direction, when the user's view is focused on any one picture, the wearable device 100 may capture an image of the view-focused picture.

Also, the wearable device 100 may capture an image of the message displayed according to the execution of the messenger application.

The still image displayed by the wearable device 100 may change at certain time intervals. When the displayed still image changes at certain time intervals, the wearable device 100 may capture each of the changed still images.

In operation S650, the wearable device 100 may transmit the image of the screen captured to the device 200.

In operation S660, the device 200 may display the image of the screen received.

For example, the device 200 may display the image by adjusting the size of the image, the aspect ratio of the screen image, and the image quality of the image displayed according to the preset display standard. For example, according to the user's setting, the image of the screen received may be enlarged and displayed by a factor of 2 in comparison with the still image displayed by the wearable device 100.

Also, according to the user's setting, the device 200 may determine the display position of the received screen image in the device 200. For example, the received screen image may be displayed at the top of the screen of the device 200.

As another example, the received screen image may be displayed at the top left of the screen while overlapping with the image displayed in the device 200. Also, as another example, the device 200 may split the screen, display the received screen image in a first region of the screen, and display the image, which is displayed when the information about the image is received, in a second region of the screen.

Figure 7:
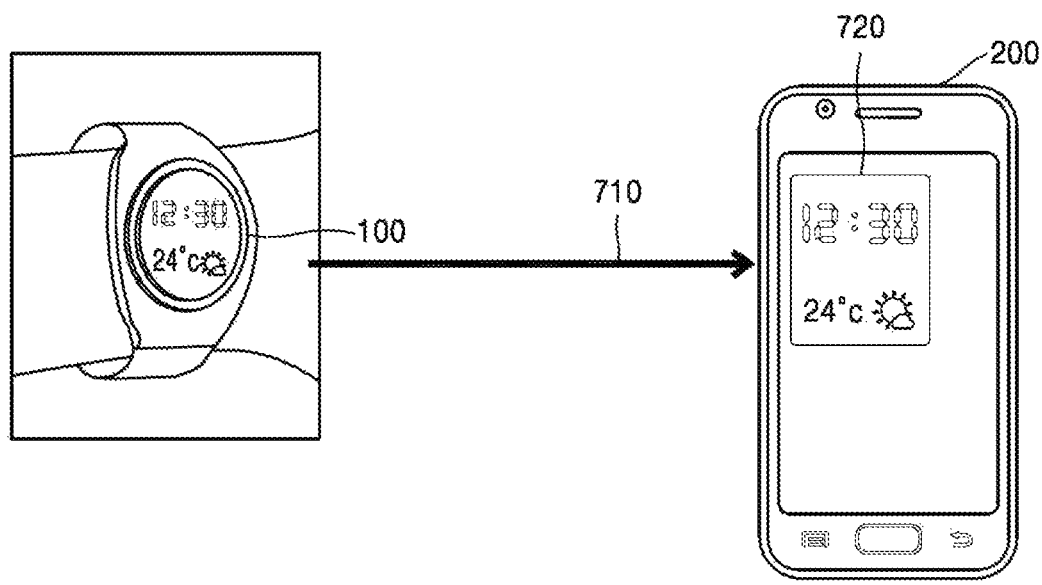
FIG. 7 is a diagram illustrating a method of transmitting an image of a screen captured to a device 200 when an image displayed by a wearable device is a still image, according to an embodiment of the inventive concept.

FIG. 7 is a diagram illustrating a method of transmitting the image of the screen captured to the device 200 when the image displayed by the wearable device 100 is a still image, according to an embodiment of the inventive concept.

The device 200 may receive a user input including an operation of holding a portion of the device 200. According to receiving the user input, the device 200 may generate the use information indicating that the user uses the device 200.

The device 200 may transmit the use information to the wearable device 100. According to an embodiment, the device 200 may transmit the use information to the wearable device 100 at predetermined time intervals while receiving a user input including an operation of holding a portion of the device 200. According to another embodiment, when receiving a user input including an operation of holding a portion of the device 200, the device 200 may transmit the use information, and when no more receiving the user input, the device 200 may transmit the use end information.

According to acquiring the use information, the wearable device 100 may capture an image 710 of the screen where a still image is displayed.

Referring to FIG. 7, the message received by the wearable device 100 may be displayed on the screen according to the execution of the messenger application in the wearable device 100. The wearable device 100 may capture an image 710 of the screen where the message is displayed.

The wearable device 100 may transmit the captured screen image 720 to the device 200. The device 200 may display the received captured screen image 720 on one side of the screen of the device 200.

When the displayed still image changes according to receiving a new message, the wearable device 100 may capture an image 710 of the screen where the changed still image is displayed. The wearable device 100 may transmit the captured screen image 720 to the device 200 whenever capturing the changed still image.

The device 200 may display the captured image 720 received from the wearable device 100 according to the same display standard as the wearable device 100. For example, the device 200 may display the received captured image 720 with the same image quality, the same aspect ratio, and the same size as the still image of the message displayed by the wearable device 100. As another example, according to the user's setting, the received captured image 720 may be displayed according to the different display standard from the still image displayed by the wearable device 100.

Figure 8:
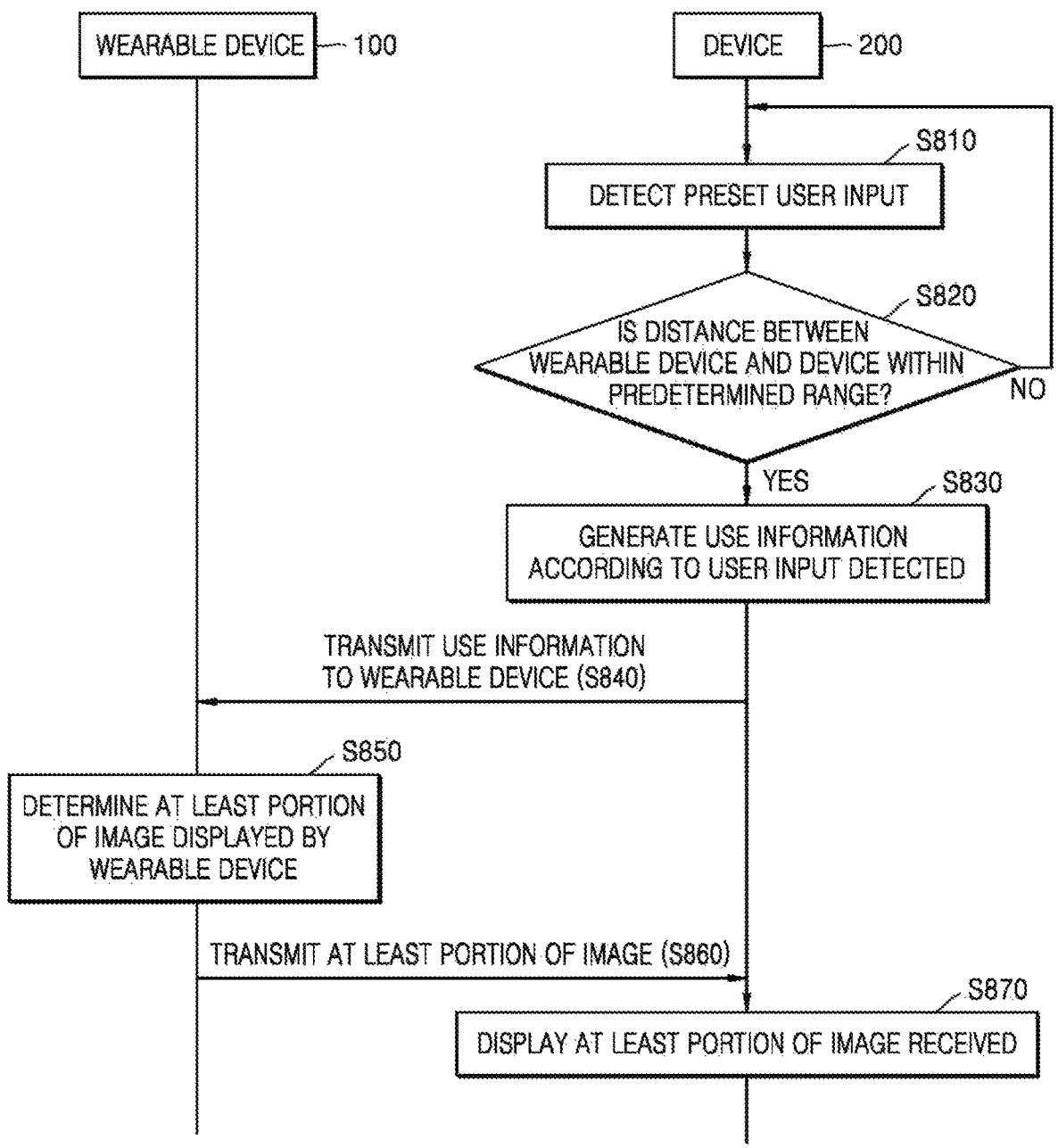
FIG. 8 is a flow diagram illustrating a method of generating use information according to the distance between a wearable device and a device, according to an embodiment of the inventive concept.

FIG. 8 is a flow diagram illustrating a method of generating the use information according to the distance between the wearable device 100 and the device 200, according to an embodiment of the inventive concept.

In operation S810, the device 200 may receive at least one of a plurality of preset user inputs. The plurality of user inputs may be preset based on the operations that may occur when the user uses the device.

Operation S810 may correspond to operation S410 described above with reference to FIG. 4.

In operation S820, the device 200 may determine whether the distance between the wearable device 100 and the device 200 is within a predetermined range.

According to an embodiment, the device 200 may determine whether the distance between the device 200 and the wearable device 100 is within a predetermined range, according to whether short-range communication is possible with the wearable device 100. For example, when near field communication (NFC) or Bluetooth communication is possible between the wearable device 100 and the device 200, the device 200 may determine that the distance between the wearable device 100 and the device 200 is within a predetermined range.

According to another embodiment, the device 200 may determine the distance between the device 200 and the wearable device 100 based on the time taken to receive a response to a transmitted dummy signal from the wearable device 100. Herein, as a signal transmitted for distance measurement, the dummy signal contains no information.

In operation S830, the device 200 may generate the use information according to the user input received. According to an embodiment, the device 200 may receive at least one of a plurality of preset user inputs and generate the use information when the distance between the device 200 and the wearable device 100 is within a predetermined range.

In operation S840, the device 200 may transmit the use information to the wearable device 100. According to an embodiment, the device 200 may periodically transmit the use information to the wearable device 100 while receiving the user input.

According to another embodiment, after transmitting the use information generated according to the received user input, the device 200 may transmit the use end information at the time when the user input is not received.

Operation S840 may correspond to operation S430 described above with reference to FIG. 4.

In operation S850, the wearable device 100 may determine at least a portion of the image displayed.

When acquiring the use information, the wearable device 100 may determine the type of the image displayed. When the image displayed is a still image, the wearable device 100 may capture an image displayed on the screen. Also, when the image displayed by the wearable device 100 is a moving image, the wearable device 100 may capture an image of the frame displayed at the play position at the time of receiving the use information.

However, determining at least a portion of the image is merely an embodiment. For example, according to another embodiment, the wearable device 100 may generate the synchronization information representing the play position of the moving image displayed at the time of receiving the use information.

Operation S850 may correspond to operation S220 described above with reference to FIG. 2.

In operation S860, the wearable device 100 may transmit the at least a portion of the image determined to the device 200.

According to an embodiment, when the image displayed is a still image, the wearable device 100 may transmit the image captured to the device 200. Also, when the image displayed is a moving image, the wearable device 100 may transmit the synchronization information to the device 200 together with the image captured.

However, this is merely an embodiment of the inventive concept. For example, according to another embodiment, when the image displayed is a moving image, the wearable device 100 may transmit only the synchronization information to the device 200.

Operation S860 may correspond to operation S230 described above with reference to FIG. 2.

In operation S870, the device 200 may display the at least a portion of the image received. The device 200 may display the at least a portion of the image received on one side of the screen. The region for displaying the at least a portion of the image received may be determined according to the user's selection.

Also, the display standard for displaying the at least a portion of the image received on the screen of the device 200 may be the same as the display standard of the wearable device 100. However, this is merely an embodiment. For example, according to the setting, the at least a portion of the image received may be displayed on the screen of the device 200 according to the standard different from the display standard of the wearable device 100.

Figure 9B:
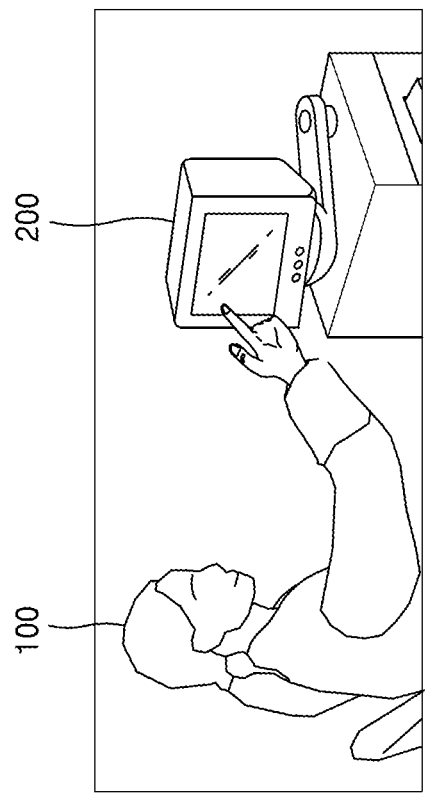
FIGS. 9a and 9b is a diagram illustrating a method of generating use information according to the distance between a wearable device and a device, according to an embodiment of the inventive concept.
Figure 9A:
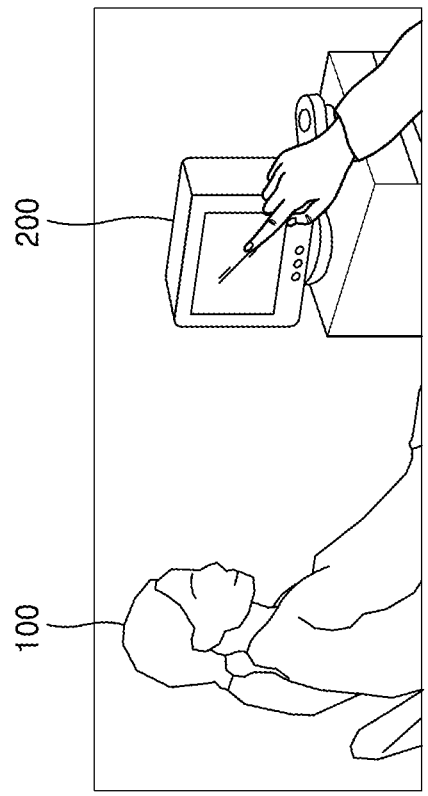

FIGS. 9A and 9B is a diagram illustrating a method of generating the use information according to the distance between the wearable device 100 and the device 200, according to an embodiment of the inventive concept.

Referring to FIG. 9A, the device 200 may receive a user input including an operation of touching the screen of the device 200, among a plurality of preset user inputs.

The device 200 may determine whether the distance between the wearable device 100 and the device 200 is within a predetermined range. According to an embodiment, the device 200 may determine whether NFC communication is established with the wearable device 100. When NFC communication is established with the wearable device 100, the device 200 may determine that the distance between the wearable device 100 and the device 200 is within a predetermined range. According to another embodiment, the device 200 may transmit a dummy signal to the wearable device 100 and determine the distance between the device 200 and the wearable device 100 based on the time taken to receive a response to the dummy signal from the wearable device 100.

The device 200 may generate the use information when the device 200 is located within a predetermined distance range from the wearable device 100 and receives any one of the plurality of preset user inputs. In the case of FIG. 9A, since the distance between the device 200 and the wearable device 100 is not within a predetermined range, the device 200 may not generate the use information.

As illustrated in FIG. 9A, by generating the use information only when the distance between the device 200 and the wearable device 100 is within a predetermined range, it is possible to prevent an error of incorrectly generating the use information when another user uses the device 200.

Referring to FIG. 9B, the device 200 may receive a user input including an operation of touching the screen of the device 200, among a plurality of preset user inputs.

The device 200 may determine whether the distance between the wearable device 100 and the device 200 is within a predetermined range. According to an embodiment, the device 200 may determine whether NFC communication is established with the wearable device 100. When NFC communication is established with the wearable device 100, the device 200 may determine that the distance between the wearable device 100 and the device 200 is within a predetermined range. According to another embodiment, the device 200 may transmit a dummy signal to the wearable device 100 and determine the distance between the device 200 and the wearable device 100 based on the time taken to receive a response to the dummy signal from the wearable device 100.

Referring to FIG. 9B, the device 200 may generate the use information since the device 200 is located within a predetermined distance range from the wearable device 100 and receives a user input including an operation of touching the screen, among a plurality of preset user inputs.

FIG. 10 is a diagram illustrating a method of generating the use information according to the distance between a device 1000 of a user and a wearable device 100 of another user, according to an embodiment of the inventive concept.

Referring to FIG. 10, the device 1000 of the user may detect the wearable device 100 of another user located within a predetermined distance range therefrom. For example, when the device 1000 may perform short-range communication with the wearable device 100 of another user, the device 1000 may determine that the wearable device 100 of another user is located within a predetermined distance range therefrom.

The device 1000 may generate the use information when the wearable device 100 of another user is located within a predetermined distance range therefrom and when the device 1000 receives a preset user input 1010. The device 1000 may transmit the use information generated to the wearable device 100 of another user. Herein, the use information may be transmitted based on the short-range communication established with the wearable device of another user. However, this is merely an embodiment, and the inventive concept is not limited thereto.

The wearable device 100 of another user may determine at least a portion of the image displayed according to the use information acquired from the device 1000. For example, the wearable device 100 may capture an image of the real-time map displayed according to the execution of the navigation application.

As another example, the wearable device 100 may transmit, to the device 1000, the current play position including the scale information and the location information of the real-time map displayed, and the synchronization information including the identification value indicating that the image displayed is the real-time map.

The device 1000 may display at least a portion of the image received. For example, the device 1000 may display the received captured map image. According to another embodiment, based on the received synchronization information, the device 1000 may display the image including the same data as the image displayed by the wearable device 100. For example, by using the received synchronization information, the device 1000 may execute the navigation application stored in the device 1000, input the location information and the scale information, and display the image of the real-time map about the same location as the image displayed by the wearable device 100.

Figure 11:
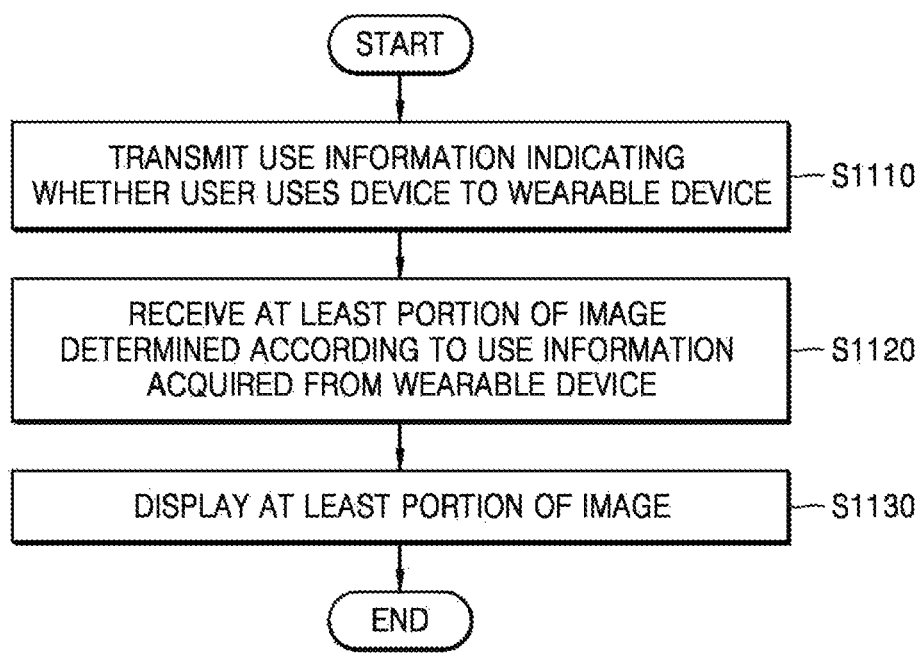
FIG. 11 is a flow diagram illustrating a method of a device displaying at least a portion of an image received from a wearable device, according to an embodiment of the inventive concept.

FIG. 11 is a flow diagram illustrating a method of the device 200 displaying at least a portion of the image received from the wearable device 100, according to an embodiment of the inventive concept.

In operation S1110, the device 200 may transmit, to the wearable device 100, the use information indicating whether the user uses the device 200.

When receiving at least one of a plurality of preset user inputs, the device 200 may generate the use information indicating that the user uses the device 200. The plurality of user inputs may be preset based on the operations that may occur when the user uses the device.

For example, the use information may be generated when the device 200 receives a user input including an operation of touching the screen from the user. As another example, the use information may be generated in the case of receiving both a user input including an operation of touching the screen and a user input including an operation of holding the screen.

The device 200 may transmit the use information to the wearable device 100. According to an embodiment, the device 200 may periodically transmit the use information to the wearable device 100 while receiving the user input.

In operation S1120, the device 200 may receive information about at least a portion of the image determined according to the use information acquired, from the wearable device 100.

For example, the device 200 may receive synchronization information about the image displayed according to the use information acquired, from the wearable device 100. The synchronization information may include the current play position of the moving image and the identification value of the moving image displayed by the wearable device 100.

Herein, the identification value of the moving image may include information about the type of the moving image and the application playing the moving image.

Also, the current play position of the moving image may include the number of a frame displayed at the time of receiving the use information, among a plurality of frames constituting the moving image. As another example, the current play position of the moving image may include play data necessary to output a screen of the moving image displayed by the wearable device 100.

The synchronization information may further include the information about the storage position of the moving image. For example, the synchronization information may include the information about the link address of the external server storing the moving image and the identification information of the external device storing the moving image.

In operation S1130, the device 200 may display the at least a portion of the image determined.

According to an embodiment, the device 200 may receive the captured screen image from the wearable device 100. The device 200 may display the received captured screen image on one side of the screen of the device 200. Also, according to the user's setting, the device 200 may determine the display position of the captured screen image in the device 200. The captured screen image may be displayed at the top left of the screen while overlapping with the image displayed when the device 200 receives the information about the image. As another example, the device 200 may split the screen, display the captured screen image in a first region of the screen, and display the image, which is displayed when the information about the image is received, in a second region of the screen.

For example, the device 200 may determine the size, the aspect ratio, and the image quality of the screen image displayed according to the preset display standard.

According to another embodiment, when a moving image is displayed by the wearable device 100, the device 200 may receive the synchronization information representing the current play position of the moving image and the identification value of the moving image displayed. Also, as another example, when a moving image is displayed by the wearable device 100, the device 200 may receive both the synchronization information and the image obtained by capturing the screen where the moving image is displayed.

According to an embodiment, from the received synchronization information, the device 200 may acquire the information about the identification value of the moving image and the play position of the moving image displayed by the wearable device 100. The device 200 may select the moving image matching the identification value of the moving image received among the identification values of the moving images stored. The device 200 may display the frame of the position corresponding to the information about the play position received in the selected moving image.

As another example, from the information about the play position of the moving image, the device 200 may acquire the play data necessary to output the screen displayed by the wearable device 100. The play data may vary according to the applications. For example, the device 200 may acquire the play data representing a location A and a scale 1:n, as the play data necessary to output the real-time map of the navigation application.

Figure 12:
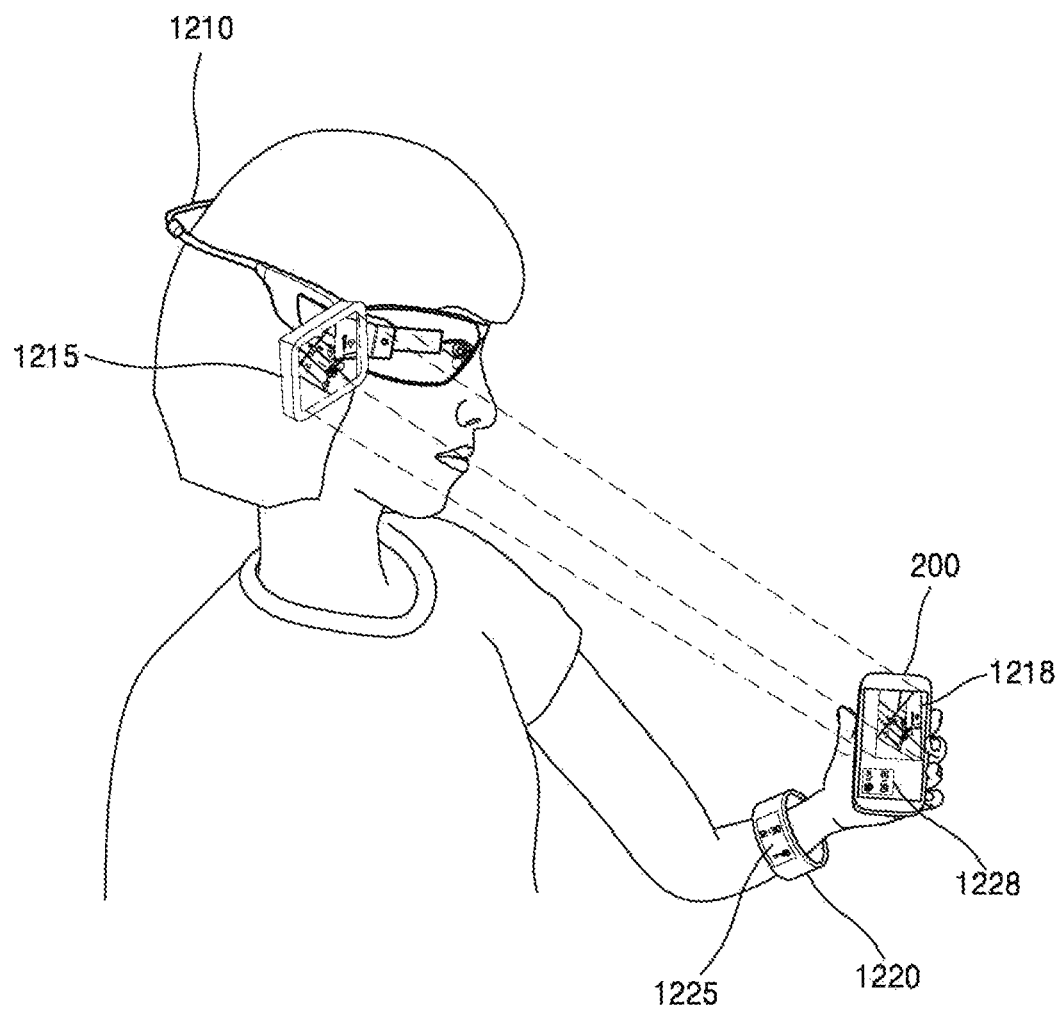
FIG. 12 is a diagram illustrating a method of a device displaying at least portions of images received from a plurality of wearable devices, according to an embodiment of the inventive concept.

FIG. 12 is a diagram illustrating a method of the device 200 displaying at least portions of images received from a plurality of wearable devices 1210 and 1220, according to an embodiment of the inventive concept.

The device 200 may receive a user input including an operation of holding a portion of the device 200, among a plurality of preset user inputs. The device 200 may generate the use information according to receiving the preset user input.

The device 200 may transmit the use information to the plurality of wearable devices 1210 and 1220. According to an embodiment, the device 200 may acquire the identification information about the plurality of wearable devices 1210 and 1220 capable of short-range communication with the device 200. According to the acquired identification information, the device 200 may transmit the use information indicating that the user uses the device 200, to each of the plurality of wearable devices 1210 and 1220.

The first wearable device 1210 may capture an image of the screen where a still image is displayed.

For example, the first wearable device 1210 may capture an image 1215 of the entire screen displaying a picture displayed according to the execution of the picture folder application. As another example, the wearable device 1210 may capture an image of a picture selected among at least one picture displayed. The first wearable device 1210 may transmit a first image 1218 of the screen captured to the device 200.

The second wearable device 1220 may capture a portion of an image 1225 of the screen where a message is displayed according to the execution of the messenger application. The second wearable device 1220 may capture an image of the region where a recently-received image is displayed. The second wearable device 1220 may transmit a second image 1228 captured to the device 200.

The device 200 may display the received captured first image 1218 and second image 1228 of the screen. Also, according to the user's setting, the device 200 may determine the display position of the first image 1218 and the second image 1228 in the device 200. The first image 1218 may be displayed at the top left of the screen of the device 200, and the second image 1228 may be displayed at the top right of the screen of the device 200.

The device 200 may display the respective identification information of the plurality of wearable devices 1210 and 1220 together with the captured screen images 1218 and 1228 received respectively from the plurality of wearable devices 1210 and 1220.

Figure 13:
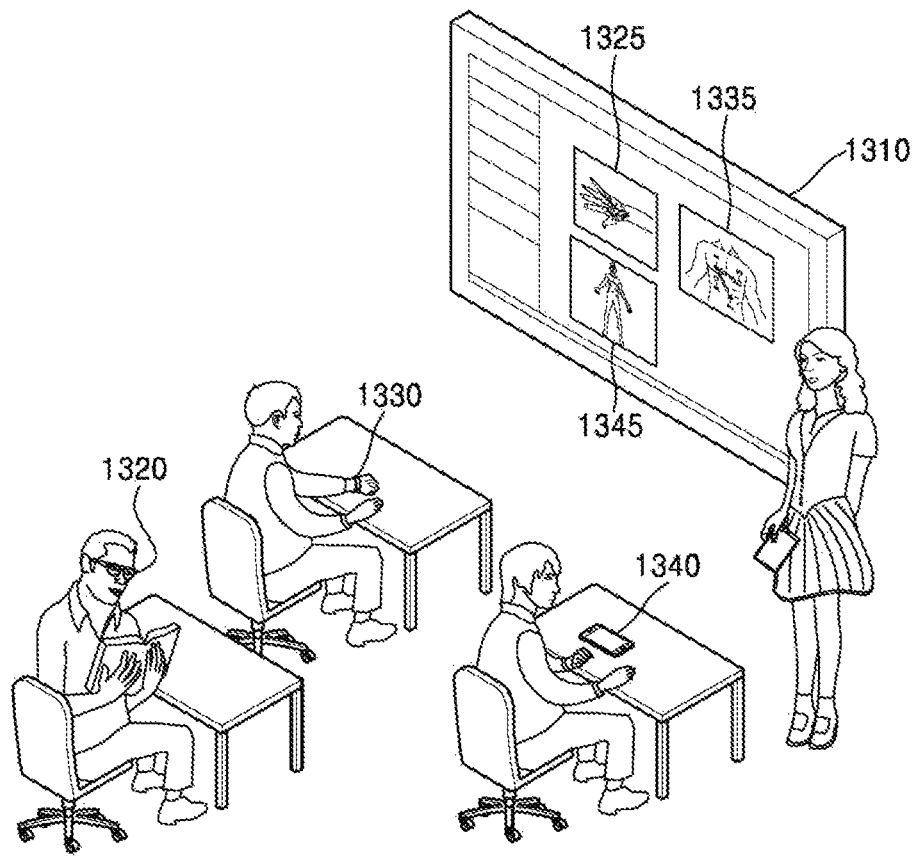
FIG. 13 is a diagram illustrating a method of a device 1310 displaying at least portions of images determined by a plurality of wearable devices 1320, 1330, and 1340, according to an embodiment of the inventive concept.

FIG. 13 is a diagram illustrating a method of a device 1310 displaying at least portions of images determined by a plurality of wearable devices 1320, 1330, and 1340, according to an embodiment of the inventive concept.

Referring to FIG. 13, the device 1310 may detect the wearable devices 1320, 1330, and 1340 capable of performing short-range communication.

The device 1310 may establish a communication session by performing an authentication process with each of the wearable devices 1320, 1330, and 1340 when detecting the wearable devices 1320, 1330, and 1340. The device 1310 may perform the authentication process by comparing the identification values received from the wearable devices 1320, 1330, and 1340 with the identification values of the wearable devices 1320, 1330, and 1340 pre-registered in the device 1310.

The device 1310 may generate the use information according to the user input received. For example, the device 1310 may generate the use information according to receiving a user input of touching an execution icon displayed by the device 1310 from the user. Also, the use information may be transmitted based on the short-range communication established with the wearable device of another user. However, this is merely an embodiment, and the inventive concept is not limited thereto. The wearable devices 1320, 1330, and 1340 may determine at least a portion of the image displayed according to the use information acquired from the device 1310.

Each of the wearable devices 1320, 1330, and 1340 may transmit the at least a portion of the image determined to the device 1310. The device 1310 may display at least portions 1325, 1335, and 1345 of the images received respectively from the wearable devices 1320, 1330, and 1340 on the screen. The device 1310 may display the respective identification values of the wearable devices 1320, 1330, and 1340 together with the at least portions 1325, 1335, and 1345 of the images received.

Referring to FIG. 13, for example, the device 1310 may be an electronic blackboard that is used in school. The device 1310 may receive at least portions of the images determined from the wearable devices 1320, 1330, and 1340 that are used respectively by students. For example, in the case of the progress of a lesson in school, each student may find data through each wearable device (e.g., 1320) and transmit the found data to the device 1310 according to receiving the use information from the device 1310. By transmitting at least portions of the images displayed respectively by the wearable devices 1320, 1330, and 1340 to the device 1310, the students may more easily share the data with each other.

Figure 14:
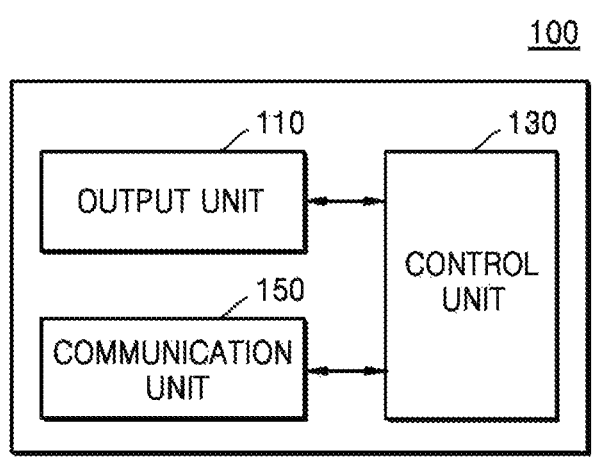
FIG. 14 is a block diagram illustrating a configuration of a wearable device according to an embodiment of the inventive concept.

FIG. 14 is a block diagram illustrating a configuration of the wearable device 100 according to an embodiment of the inventive concept.

As illustrated in FIG. 14, the wearable device 100 according to an embodiment of the inventive concept may include an output unit 110, a control unit 130, and a communication unit 150. However, not all the elements illustrated in FIG. 14 are necessary elements of the wearable device 100. The wearable device 100 may include more or less components than the illustrated components.

The output unit 110 may display the image output according to the execution of the application in the wearable device 100. Herein, the image may include at least one of a still image and a moving image.

The communication unit 150 may acquire the use information indicating whether the user uses the device 200. When the communication unit 150 acquires the use information, the control unit 130 may determine that the user uses the device 200.

When the device 200 receives at least one of a plurality of preset user inputs from the user, the use information may be generated by the device 200.

The control unit 130 may determine at least a portion of the image displayed according to the use information acquired. When acquiring the use information, the control unit 130 may determine the type of the image displayed. When the image displayed is a still image, the control unit 130 may capture an image displayed on the screen.

The still image displayed by the wearable device 100 may change at certain time intervals. When the still image displayed changes at certain time intervals, the control unit 130 may capture the still images changed until receiving the use end information indicating that the user ends the use of the device 200 from the device 200. Herein, the use end information may be generated when the user input used as a basis to generate the use information is not received by the device 200.

Also, when the image displayed by the wearable device 100 is a moving image, the control unit 130 may capture an image of the frame displayed at the play position at the time of receiving the use information.

According to another embodiment, the control unit 130 may generate the synchronization information representing the play position of the moving image displayed at the time of receiving the use information. The control unit 130 may determine the identification value of the moving image displayed at the time of receiving the use information. For example, when the moving image displayed is a movie B, the control unit 130 may determine the code number representing the movie B as the identification value of the moving image.

Also, in the entire play section of the moving image, the control unit 130 may determine the current play position of the moving image displayed at the time of receiving the use information. For example, among a plurality of frames constituting the moving image, the control unit 130 may determine the number of the frame displayed at the time of receiving the use information. The control unit 130 may generate the synchronization information based on the current play position of the moving image and the identification value of the moving image.

According to an embodiment, the control unit 130 may determine at least a portion of the image displayed on the entire screen. For example, the control unit 130 may determine the entire image of the real-time map displayed according to the execution of the navigation application. As another example, the control unit 130 may determine a picture in the user's viewing direction, which is a partial image, in the picture list that is the image displayed on the entire screen according to the execution of the picture folder application.

The communication unit 150 may transmit the at least a portion of the image determined to the device 200. According to an embodiment, when the image displayed is a still image, the communication unit 150 may transmit the image captured to the device 200. Also, when the image displayed is a moving image, the communication unit 150 may transmit the synchronization information to the device 200 together with the image captured.

According to an embodiment, when the image displayed is a moving image, the communication unit 150 may transmit only the synchronization information to the device 200.

Figure 15:
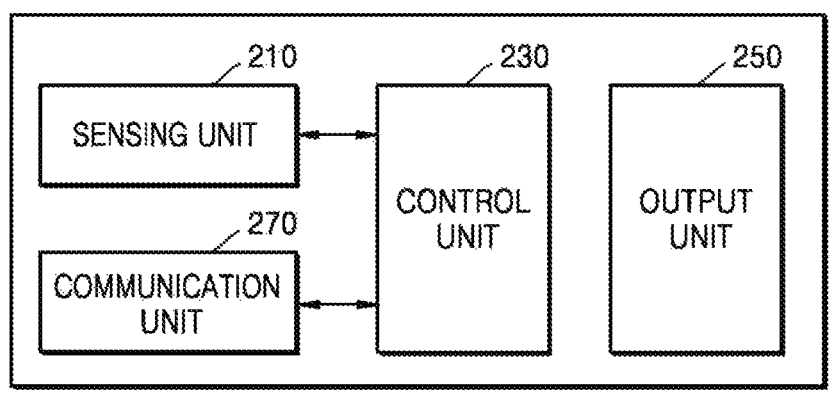
FIGS. 15 and 16 are block diagrams illustrating a configuration of a device according to an embodiment of the inventive concept.
Figure 16:
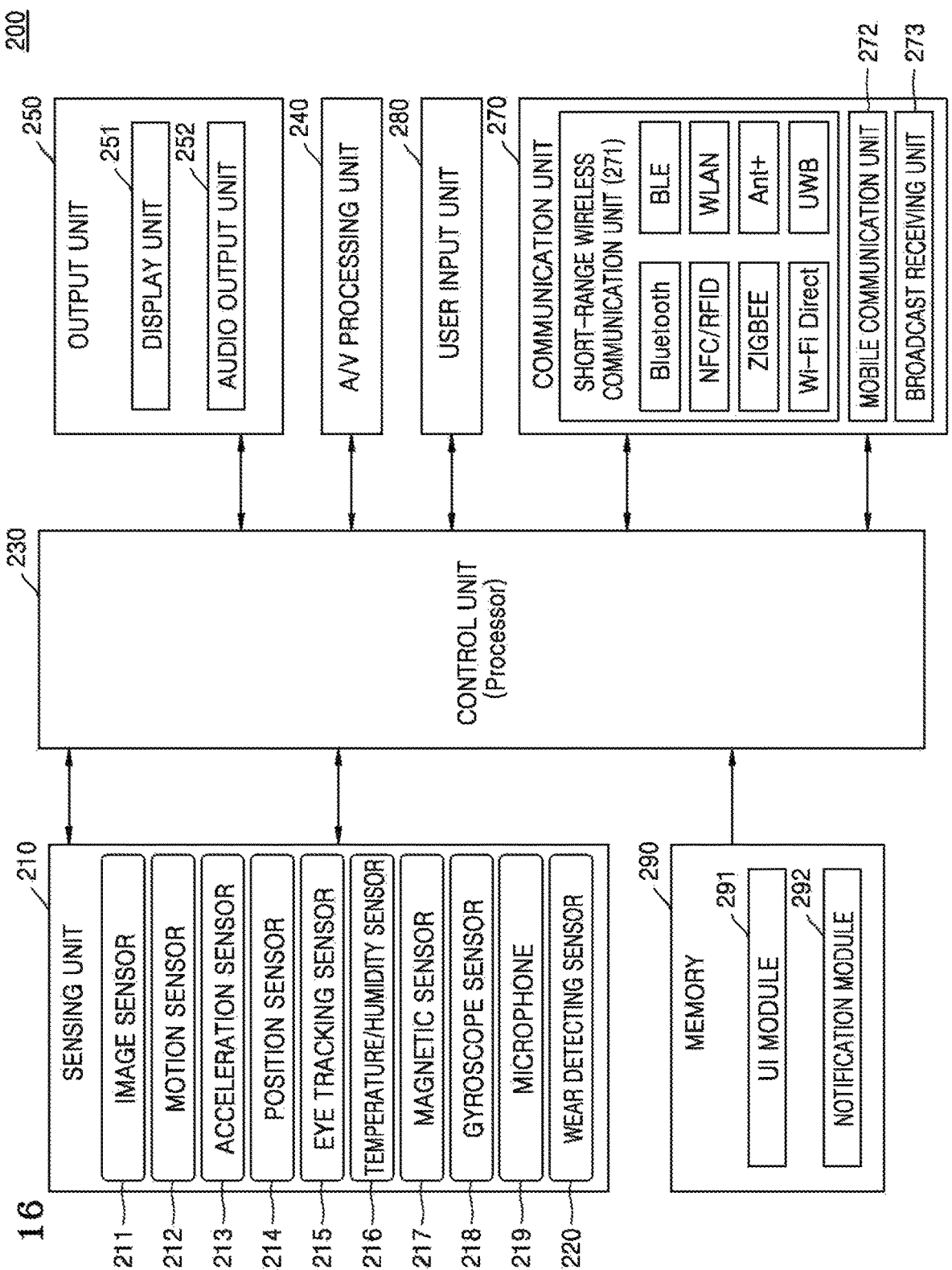

FIGS. 15 and 16 are block diagrams illustrating a configuration of the device 200 according to an embodiment of the inventive concept.

As illustrated in FIG. 15, the device 200 according to an embodiment of the inventive concept may include a sensing unit 210, a control unit 230, a communication unit 270, and an output unit 250. However, not all the elements illustrated in FIG. 15 are necessary elements of the device 200. The device 200 may include elements more or less than the elements illustrated in FIG. 15.

For example, as illustrated in FIG. 16, the device 200 according to an embodiment of the inventive concept may further include an audio/video (A/V) processing unit 240, a user input unit 280, and a memory 290.

The above elements will be described below in detail.

The sensing unit 210 may detect whether the user uses the device 200. For example, when receiving at least one of a plurality of preset user inputs, the sensing unit 210 may detect that the user uses the device 200.

The sensing unit 210 may include, but is not limited to, at least one of a image sensor 211, a motion sensor 212, an acceleration sensor 213, a position sensor (e.g., GPS sensor) 214, a eye tracking sensor 215, a temperature/humidity sensor 216, a magnetic sensor 217, a gyroscope sensor 218, a microphone 219 and a wear detecting sensor 220. Since those of ordinary skill in the art may intuitively infer the respective functions of the sensors from the respective names thereof, detailed descriptions thereof will be omitted for conciseness.

The control unit 230 may control the overall operations of the device 200. For example, the control unit 230 may control the overall operations of the sensing unit 210, the audio/video (A/V) processing unit 240, the communication unit 270, the output unit 250, and the user input unit 280 by executing the programs stored in the memory 290.

When receiving at least one of a plurality of preset user inputs, the control unit 230 may generate the use information indicating that the user uses the device 200. The plurality of user inputs may be preset based on the operations that may occur when the user uses the device.

The control unit 230 may determine the display position of the received at least a portion of the image in the device 200. For example, the control unit 230 may determine the size, the aspect ratio, and the image quality of the image displayed according to the display standard.

From the received synchronization information, the control unit 230 may acquire the information about the identification value of the moving image and the play position of the moving image displayed by the wearable device 100. The control unit 230 may select the moving image matching the identification value of the moving image received among the identification values of the moving images stored. The control unit 230 may control the output unit 250 to display the frame of the position corresponding to the information about the play position received in the selected moving image.

As another example, from the information about the play position of the moving image, the control unit 230 may acquire the play data necessary to output the screen displayed by the wearable device 100.

The A/V processing unit 240 may be used to input audio signals or video signals and may include a camera (not illustrated) and a microphone (not illustrated). The camera may obtain an image frame such as a still image or a moving image through an image sensor in a video call mode or a photographing mode. The image captured through the image sensor may be processed by the control unit 230 or a separate image processing unit (not illustrated).

The image frame processed by the camera may be stored in the memory 290, or may be transmitted to an outside thereof through the communication unit 270. Two or more cameras may be provided according to the configurations of the device 200.

The microphone may receive an input of an external audio signal and process the same into electrical audio data. For example, the microphone may receive an audio signal from an external device or a speaker. The microphone may use various noise cancellation algorithms for canceling a noise that may be generated in the process of receiving an input of an external audio signal.

The communication unit 270 may transmit the use information to the wearable device 100. According to an embodiment, the communication unit 270 may periodically transmit the use information to the wearable device 100 while receiving the user input. According to another embodiment, the communication unit 270 may once transmit the use information generated according to the received user input.

The communication unit 270 may receive at least a portion of the image determined according to the use information acquired, from the wearable device 100. According to an embodiment, the communication unit 270 may receive the captured screen image from the wearable device 100.

According to another embodiment, the communication unit 270 may receive the synchronization information about the image displayed according to the use information acquired, from the wearable device 100.

The communication unit 270 may include one or more elements for allowing communication between the device 200 and the wearable device 100. For example, the communication unit 270 may include a short-range wireless communication unit 271, a mobile communication unit 72, and a broadcast receiving unit 273.

The short-range wireless communication unit 271 may include, but is not limited to, a Bluetooth communication unit, a Bluetooth Low Energy (BLE) communication unit, a near field communication unit, a WLAN (WiFi) communication unit, a ZigBee communication unit, an infrared data association (IrDA) communication unit, a WiFi Direct (WFD) communication unit, a ultra wideband (UWB) communication unit, and Ant+ communication unit.

The mobile communication unit 272 may communicate wireless signals with at least one of a base station, an external terminal, and a server on a mobile communication network. Herein, the wireless signals may include voice call signals, video call signals, or various types of data for transmission and reception of text/multimedia messages.

The broadcast receiving unit 273 may receive broadcast signals and/or broadcast-related information from external devices through broadcast channels. The broadcast channels may include satellite channels and terrestrial channels. In some embodiments, the device 200 may not include the broadcast receiving unit 273.

The output unit 250 may be configured to perform the operation determined by the control unit 230 and may include, for example, a display unit 251, an audio output unit 272, and a vibration motor (not illustrated).

The display unit 251 may display information processed by the device 200. For example, the display unit 251 may display at least a portion of the image received. The display unit 251 may display the received screen image on one side of the screen.

When the display unit 251 includes a touchscreen with a layer structure of a touch pad, the display unit 251 may also be used as an input device in addition to an output device. The display unit 251 may include at least one of a liquid crystal display (LCD), a thin film transistor liquid crystal display (TFT-LCD), an organic light-emitting diode (OLED) display, a flexible display, a three-dimensional (3D) display, and an electrophoretic display. Also, the device 200 may include two or more display units 251 according to embodiments. In this case, the two or more display units 251 may be disposed to face each other through a hinge structure.

The audio output unit 252 may output audio data received from the communication unit 270 or stored in the memory 290. Also, the audio output unit 252 may output audio signals related to functions (e.g., call signal reception, message reception, and notification) performed in the device 200. The audio output unit 252 may include, for example, a speaker and a buzzer.

The vibration motor may output a vibration signal. For example, the vibration motor may output a vibration signal corresponding to an output of audio data or video data (e.g., a call signal reception sound and a message reception sound). Also, the vibration motor 273 may output a vibration signal when a touch is input to a touchscreen.

The user input unit 280 may refer to a unit through which the user inputs data for controlling the device 200. For example, the user input unit 280 may include, but is not limited to, a keypad, a dome switch, a touch pad (e.g., a capacitive overlay type, a resistive overlay type, an infrared beam type, a surface acoustic wave type, an integral strain gauge type, or a piezoelectric type), a jog wheel, and a jog switch.

The memory 290 may store programs for processing and control operations of the control unit 230, and may store input/output data (e.g., menus, first layer submenus corresponding respectively to the menus, and second layer submenus corresponding respectively to the first layer submenus).

The memory 290 may store biometric information of a user about at least one piece of content and context information of the user. Also, the memory 290 may store a reference emotion information database. The memory 290 may store content summary information.

The memory 290 may include at least one type of storage medium from among flash memory type, hard disk type, multimedia card micro type, card type memory (e.g., SD and XD memories), random-access memory (RAM), static random-access memory (SRAM), read-only memory (ROM), electronically erasable programmable read-only memory (EEPROM), programmable read-only memory (PROM), magnetic memory, magnetic disk, and optical disk. Also, the device 200 may include a cloud server or a web storage for performing a storage function of the memory 290 on the Internet.

The programs stored in the memory 290 may be classified into a plurality of modules according to their functions and may be classified into, for example, a user interface (UI) module 291, a touchscreen module 292, and a notification module 293.

The UI module 291 may provide a specialized UI and a graphical user interface (GUI) that interlock with the device 200 for respective applications. The touchscreen module (not illustrated) may detect a touch gesture of the user on the touchscreen and transmit information about the touch gesture to the control unit 230. According to an embodiment, the touchscreen module may recognize and analyze a touch code. The touchscreen module may include separate hardware including a controller.

Various sensors may be provided in or near the touchscreen to detect a proximity touch or a touch to the touchscreen. An example of the sensor for detecting a touch to the touchscreen may be a tactile sensor. The tactile sensor may refer to a sensor that detects a touch of an object in the degree of a human sense or more. The tactile sensor may detect a variety of information, such as the roughness of a touch surface, the hardness of a touch object, and the temperature of a touch point.

Another example of the sensor for detecting a touch to the touchscreen may be a proximity sensor.

The proximity sensor may refer to a sensor that detects the presence of an object approaching a detection surface or an object located in the proximity thereof without mechanical contact by using an electromagnetic force or infrared rays. Examples of the proximity sensor may include transmission type photoelectric sensors, direct reflection type photoelectric sensors, mirror reflection type photoelectric sensors, high frequency oscillation type proximity sensors, electrostatic capacity type proximity sensors, magnetic type proximity sensors, and infrared proximity sensors. Examples of the user's touch gesture may include tap, touch & hold, double tap, drag, panning, flick, drag & drop, and swipe.

The notification module 292 may generate a signal for notifying the occurrence of an event in the device 200. Examples of the event occurring in the device 200 may include call signal reception, message reception, key signal input, schedule notification, and user input acquisition. The notification module 292 may output a notification signal of a video signal type through the display unit 251, output a notification signal of an audio signal type through the audio output unit 252, and output a notification signal of a vibration signal type through the vibration motor.

The methods according to the embodiments of the inventive concept may be embodied in the form of program commands executable through various computer means, which may be recorded on a computer-readable recording medium. The computer-readable recording medium may include program commands, data files, and data structures either alone or in combination. The program commands recorded on the computer-readable recording medium may be those that are especially designed and configured for the inventive concept, or may be those that are known and available to computer programmers skilled in the art. Examples of the computer-readable recording medium may include magnetic recording media such as hard disks, floppy disks, and magnetic tapes, optical recording media such as CD-ROMs and DVDs, magneto-optical recording media such as floptical disks, and hardware devices such as ROMs, RAMs, and flash memories that are especially configured to store and execute program commands. Examples of the program commands may include machine language codes that may be generated by a compiler, and high-level language codes that may be executed by a computer by using an interpreter.

Although the embodiments of the inventive concept have been described above in detail, the scope of the inventive concept is not limited thereto and those of ordinary skill in the art will understand that various modifications and improvements may be made therein without departing from the spirit and scope of the inventive concept as defined by the following claims.

The invention claimed is:

1. A method for displaying an image on a device, the method comprising:
    transmitting, by the device, use information indicating whether a user uses the device to a wearable device;
    receiving, by the device, information comprising a captured image of a screen displayed by the wearable device at a time the use information acquired by the wearable device indicates the user is using the device, the captured image being captured by the wearable device;
    receiving, by the device, information comprising synchronization information of a moving image from the wearable device, the synchronization information of the moving image being generated by the wearable device based on a current play position of the moving image at the time when the wearable device receives the use information transmitted from the device indicating that the user is using the device;
    displaying, by the device, the captured image while the device retrieves a play position of the moving image using the synchronization information; and
    playing, by the device, the moving image according to the synchronization information after the displayed captured image.

2. The method of claim 1, wherein
    the received information further comprises an identification value of the moving image; and
    the method further comprises receiving the image from a server based on the synchronization information and the identification value of the moving image.

3. The method of claim 1, wherein the displaying of the image comprises displaying at least a portion of an image received from the wearable device and at least a portion of an image acquired from another wearable device at a preset position of a screen of the device together with identification information.

4. A non-transitory computer-readable recording medium that stores a program that performs the method of claim 1 when executed by a computer.

5. The method of claim 1, wherein the captured image is an image of the moving image captured by the wearable device at a play position of the moving image at a time of receiving the use information, and the synchronization information indicates the play position of the moving image at a time of receiving the use information,
    wherein the synchronization information includes an identification value of an application for playing the moving image.

6. A device for displaying an image, the device comprising:
    a display;
    a sensor configured to detect whether a user uses the device; and
    a processor configured:
        to generate use information indicating whether the user uses the device;
        to transmit the use information generated to a wearable device and receive information comprising a captured image of a screen displayed by the wearable device at a time the use information acquired by the wearable device indicates the user is using the device, the captured image being captured by the wearable device;
        to receive information comprising synchronization information of a moving image from the wearable device, the synchronization information of the moving image being generated by the wearable device based on a current play position of the moving image at a time when the wearable device receives the use information transmitted from the device indicating that the user is using the device;
        to control the display to display the captured image while the device retrieves a play position of the moving image using the synchronization information; and
        to play the moving image according to the synchronization information after the display of the captured image.

7. The device of claim 6, wherein the processor receives an identification value of the moving image and receives the moving image from a server based on the synchronization information and the identification value of the moving image.

8. The device of claim 6, wherein the processor controls the display to display at least a portion of an image received from the wearable device and at least a portion of an image acquired from another wearable device at a preset position of a screen of the device together with identification information.

9. The device of claim 6, wherein the captured image is an image of the moving image captured by the wearable device at a play position of the moving image at a time of receiving the use information, and the synchronization information indicates the play position of the moving image at a time of receiving the use information, and wherein the synchronization information includes an identification value of an application for playing the moving image.

\* \* \* \* \*